(No Model.)
J. WEIS.
ELECTRIC LOCOMOTIVE.
No. 320,025. Patented June 16, 1885.
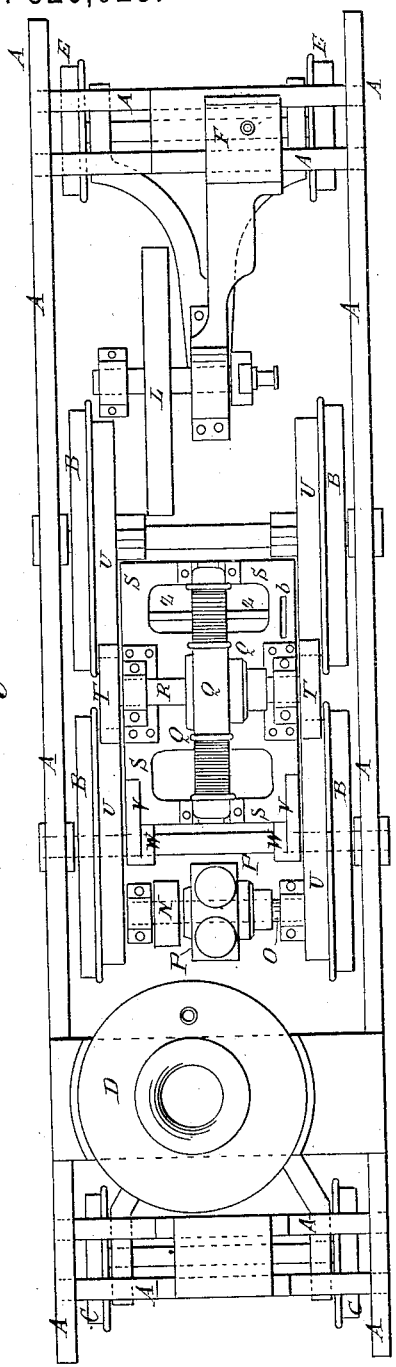
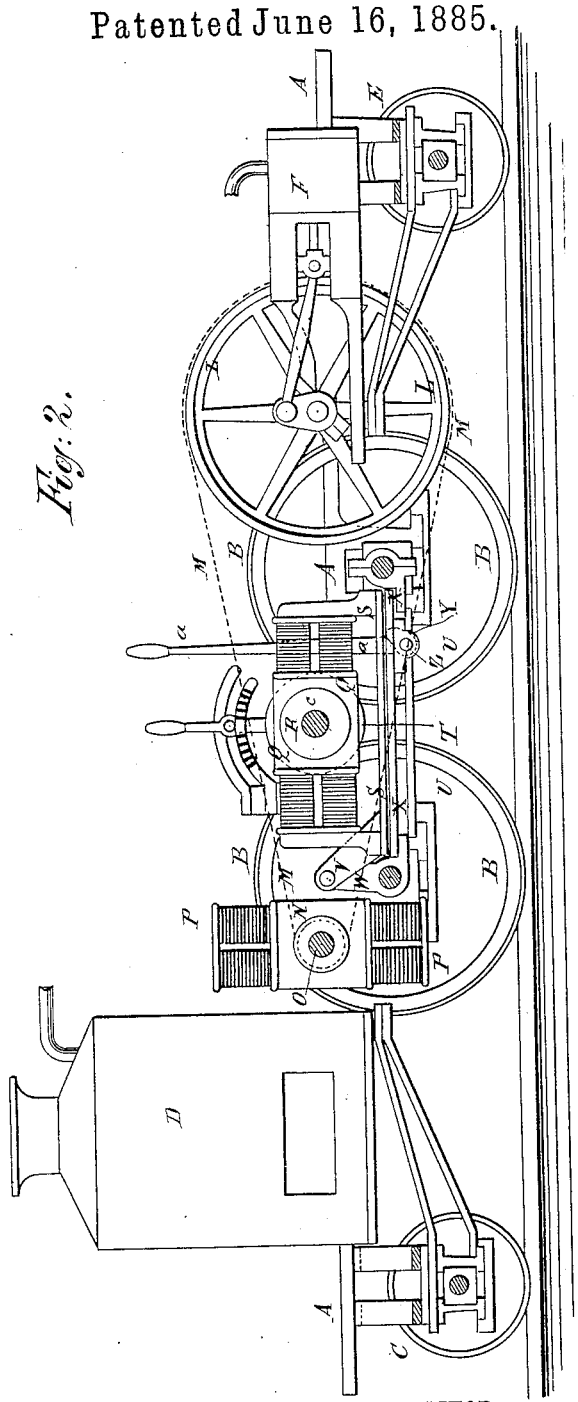
WITNESSES:
Chas. Nida
C. Sedgwick
INVENTOR:
J. Weis
BY Munn & Co
ATTORNEYS.

UNITED STATES PATENT OFFICE.

JOSEPH WEIS, OF JERSEY CITY, NEW JERSEY.

ELECTRIC LOCOMOTIVE.

SPECIFICATION forming part of Letters Patent No. 320,025, dated June 16, 1885.

Application filed October 24, 1883. (No model.)

*To all whom it may concern:*

Be it known that I, JOSEPH WEIS, of Jersey City, in the county of Hudson and State of New Jersey, have invented a new and useful Improvement in Electric Locomotives, of which the following is a full, clear, and exact description.

Reference is to be had to the accompanying drawings, forming a part of this specification, in which similar letters of reference indicate corresponding parts in all the figures.

Figure 1 is a plan view of my improvement. Fig. 2 is a sectional side elevation of the same.

My invention relates to improvements in electric locomotives; and it consists in the peculiar construction and arrangement of parts, as hereinafter fully described, and pointed out in the claims.

The frame A of the locomotive is provided with two pairs of drive-wheels, B, and with the small wheels E C at the front and rear, respectively. D is a boiler, and F is an ordinary steam-engine having a large drive-pulley, L. A belt, M, passes around the pulley L, and also around a small pulley, N, attached to the armature-shaft O of the dynamo-electric machine P. The electricity developed by the dynamo-electric machine P gives motion to the electric motor Q, whose armature-shaft R revolves in bearings attached to the frame S. To the ends of the shaft R are attached small friction-wheels T, which rest upon the adjacent faces of the large friction-wheels U, rigidly attached to or formed upon the inner sides of the drive-wheels B, so that motion will be given to the said drive-wheels B by the electric motor Q.

To the rear corners of the frame S, carrying the electric motor Q, are attached two upwardly-projecting arms, V, which incline to the rearward, and are pivoted at the upper ends to the standards W, attached to the frame X, hung from the axles of the drive-wheels B or from the frame A. The forward part of the frame S rests upon the cams or eccentrics Y, attached to the shaft Z, which rocks in bearings attached to the frame X.

To the shaft Z is secured the lever *a*, which passes up through a slot, *b*, in the frame S, so that it can be readily reached and operated. With this construction, by operating the lever *a*, the frame S and the electric motor Q will be raised slightly, raising the small friction-wheels T out of contact with the large friction-wheels U, and thereby throwing the driving mechanism out of gear.

Having thus described my invention, what I claim as new, and desire to secure by Letters Patent, is—

1. In an electric locomotive, the combination, with the wheels B, provided with the friction-wheels U, of the swinging frame S, the electric motor Q, supported in said swinging frame and having its armature-shaft R, provided with friction-wheels T, engaging the friction-wheels U, and means, substantially as described, for operating the electric motor and raising the same to disengage the friction-wheels, as set forth.

2. In an electric locomotive, the combination, with the wheels B, provided with the friction-wheels U, and the frame X, provided with the arms W, of the frame S, provided with the arms V, pivoted to the arms W, the electric motor Q, secured in said frame S, the friction-wheels T on the armature-shaft of said electric motor, the eccentrics Y, and means, substantially as described, for operating the said motor, as set forth.

JOSEPH WEIS.

Witnesses:
JAMES T. GRAHAM,
EDGAR TATE.